US012261483B2

(12) United States Patent
Martin et al.

(10) Patent No.: US 12,261,483 B2
(45) Date of Patent: Mar. 25, 2025

(54) ELECTRIC MACHINE WITH LOW PROFILE RETENTION ASSEMBLY FOR RETENTION OF STATOR CORE

(71) Applicant: GENERAL ELECTRIC COMPANY, Schenectady, NY (US)

(72) Inventors: Matthew Robert Martin, Schenectady, NY (US); Philip Michael Cioffi, Schaghticoke, NY (US); John Russell Yagielski, Scotia, NY (US); Wei Zhang, Clifton Park, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 365 days.

(21) Appl. No.: 17/975,666

(22) Filed: Oct. 28, 2022

(65) Prior Publication Data
US 2024/0146125 A1 May 2, 2024

(51) Int. Cl.
H02K 1/18 (2006.01)
H02K 1/20 (2006.01)

(52) U.S. Cl.
CPC ............. H02K 1/185 (2013.01); H02K 1/20 (2013.01)

(58) Field of Classification Search
CPC .......... H02K 1/185; H02K 1/20; H02K 3/522
See application file for complete search history.

(56) References Cited

U.S. PATENT DOCUMENTS

| 5,315,200 | A | 5/1994 | Lemieux et al. | |
| 2011/0184661 | A1* | 7/2011 | Reed | G01B 11/14 702/34 |
| 2011/0210643 | A1 | 9/2011 | Tanavde et al. | |
| 2016/0329760 | A1* | 11/2016 | Major | H02K 15/12 |
| 2020/0067367 | A1 | 2/2020 | Braun et al. | |
| 2020/0403467 | A1* | 12/2020 | Takahashi | H02K 21/14 |
| 2021/0194298 | A1* | 6/2021 | Söntgerath | H02K 5/203 |

FOREIGN PATENT DOCUMENTS

| DE | 102008035896 | 2/2010 |
| JP | 2013-162636 A | 8/2013 |
| KR | 10-2022-0049267 A | 4/2022 |

OTHER PUBLICATIONS

International Search Report, dated Feb. 14, 2024 from corresponding PCT Application No. PCT/US2023/077449.

* cited by examiner

Primary Examiner — Burton S Mullins
Assistant Examiner — Mohammed Ahmed Qureshi
(74) Attorney, Agent, or Firm — Grogan, Tuccillo & Vanderleeden LLP

(57) ABSTRACT

An electric machine with a low profile retention assembly for retention of a stator core is disclosed. A first housing houses the stator core. The first housing has an axial end face with a circumferentially extending, shaped profile having recessed portions that project axially inward alternating with non-recessed portions. A portion of the stator core extends axially out from the recessed portions. A core retention spring is disposed circumferentially at the axial end face of the first housing. The core retention spring has direct contact with the portion of the stator core that extends axially out from the recessed portions of the first housing and the shaped profile of the housing. The core retention spring pushes against the portion of the stator core that extends that extends axially out from the first housing, imparting one or more of an axial load and radial load into the stator core.

20 Claims, 9 Drawing Sheets

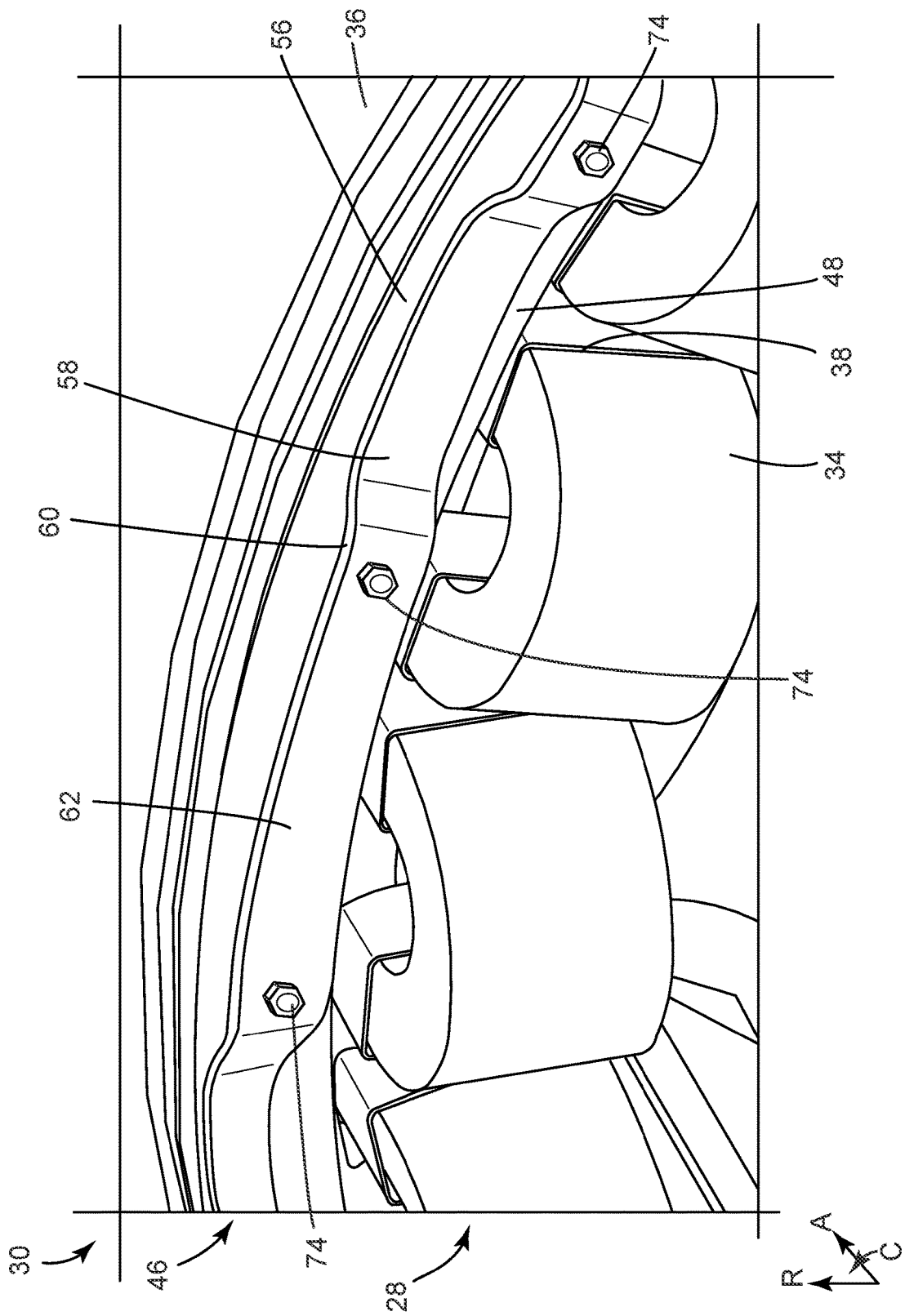

ELECTRIC MACHINE WITH LOW PROFILE RETENTION ASSEMBLY FOR RETENTION OF STATOR CORE

BACKGROUND

Technical Field

Embodiments of this disclosure relate generally to electric machines, and more specifically, to a low profile retention assembly for providing one or more of axial and radial load retention of a stator core in an electric machine.

Discussion of Art

As electric machines such as generators and motors become more prevalent in transportation applications (e.g., vehicle and aerospace), both compact sizing and weights savings of components of these machines become primary design requirements. However, the compact sizing and weight savings design requirements have to take into account that these electric machines can be subjected to different temperatures and/or environmental impact loads during machine operation, processing, and manufacture. In order to handle transient conditions that arise due to the different temperatures and/or environmental impact loads, the stator core of the electric machines has to maintain an axial force and a radial force into it to ensure proper operating function.

One approach that has been utilized to compensate for the different temperatures and/or environmental impact loads involves placing a 360° spring into a slot in a housing that contains the stator core. To this extent, the spring pushes directly against the stator core to maintain an axial force into the core that can withstand the impact loads. However, electric machines that have the primary design requirements of compact sizing and weight savings typically do not have the axial and radial space in the housing to accommodate a spring that can maintain an axial force into the stator core. In particular, because these electric machines have such tight axial and radial space constraints, there is not enough mechanical or electrical clearance room to accommodate a spring in the housing that can push directly against the stator core to maintain it in axial and/or radial compression to handle transient conditions that can arise due to the different temperatures and/or environmental impact loads.

Another consideration to take into account for electric machines that also has ramifications with regard to temperatures and/or environmental impact loads, is that electric machines are generally now being fabricated from new resin materials. For example, as higher power density electric machines are required to meet overall system power and efficiency targets, high temperature class insulation is required, necessitating the use of new resin formulations. Many of these new resin materials require curing at very elevated temperatures, sometimes significantly higher than the maximum operating temperature. Therefore, the components of the electric machines, the iron cores particularly, must be able to accommodate both thermal transient growth differentials during processing and during operation. This is especially true for press fit and shrunk-on part interfaces between components of the electric machines such as the stator core and the housing. If the interfaces between the stator core and the housing cannot accommodate the thermal transient growth differentials that arise during processing and operation, then the stator core can loosen from the housing which can affect performance of the electric machine.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

Embodiments described herein provide solutions that address the challenges associated with smaller and lighter electric machines that lack the axial and radial space to deploy a spring in a housing that contains the stator core to withstand the different temperatures and/or environmental impact loads that can arise during operation, processing and manufacture of the machines. The solutions provided by the embodiments entail using a low profile retention assembly for those smaller and lighter electric machines with stator cores in housings having tight radial and axial space constraints that can provide one or more of axial and radial load retention of the cores during machine operation, processing, and manufacture.

In one embodiment, instead of using the axial and radial space in a housing to contain the stator core, an axial face of the housing can be used to receive a spring. In this manner, the spring can press or push against a core end ring that retains the stator core in the housing. The pressing or pushing of the spring against the core end ring imparts a force (an axial load) into the stator core. To this extent, the force can maintain the stator core in axial compression.

In another embodiment, the spring can press or push directly into the stator core itself to impart the axial load directly into the core, circumventing the use of the core end ring. For example, the stator core at the axial face of the housing can be shaped with features that correspond with the shape and characteristics of the core end ring at this location, thus precluding the use of the core end ring. In this manner, the spring can be used to press or push directly into those features of the stator core that are shaped to correspond with those of a core end ring that would occupy that space noted for the prior embodiment. The pressing or pushing of the spring into those features would impart an axial load into the stator core.

In still another embodiment, a low profile retention assembly can be provided to impart one or more of a radial load and an axial load into the stator core. For example, the stator core and the core end ring at the axial face of the housing can be configured to have an angled surface (e.g., a tapered surface) formed between these components. Depending on the angled surface, the application of the spring to the surface can generate a resultant force vector into the surface that can be resolved as a radial load, an axial load, or both. To this extent, the load can then be imparted to the stator core to maintain it in the corresponding load compression.

In order to use the axial face of the housing for deployment of the spring for facilitating axial compression of the stator core, certain embodiments can provide the axial face with a geometry that allows the core end ring to sit proud in this tight axial and radial space near the housing and not be sunken or nested entirely in the housing. In one embodiment, the geometry at the axial face of the housing can include a shaped profile with recessed portions that project axially inward from the axial end face of the housing alternating with non-recessed portions. This shaped profile can extend circumferentially about the edge or margin of the axial face. In one embodiment, with the shaped profile of recessed portions that project axially inward from the axial end face of the housing alternating with non-recessed portions, a portion of the core end ring can extend axially out from the axial end face of the housing. This allows a spring applied to the axial face of the housing to press against the core end ring during the occurrence of impact loads. The pressing of the spring against the core end ring results in a force (an axial load) imparted to the stator core such that the primary load path of the force to the core is through the core end ring. In this manner, the force imparted to the stator core can maintain the core in axial compression during instances of impact loads where there is a tendency for the stator core to want to translate, deflect, or detach relative to the housing. This axial compression can be a constant compression or a changing compression.

In one embodiment, the shaped profile of the housing can include a scallop-shaped profile having a plurality of spaced scallop-shaped surfaces formed on the axial end face of the housing. In addition to the scallop-shaped profile, certain embodiments can include providing the axial face of the housing with axially and radially extending core retention spring features that enable the spring to be secured to the housing at the axial face in order to interact with the core end ring. In one embodiment, the core retention spring features can be arranged between the scallop-shaped surfaces forming an alternating pattern of scallop-shaped surfaces and core retention spring features. This allows the spring to be disposed at the axial face of the housing in such a manner that it can be secured and retained at the axial face to engage with the core end ring during instances of impact loads. In this manner, the core end ring can impart an axial load to the stator core to maintain it in axial compression during those impact load instances.

The core retention spring features can include a number of different retention features. For example, in one embodiment, the core retention spring features can include an axially extending thru-hole complementary to receive spring retention hardware and a radially extending slot opposing the thru-hole. To this extent, the thru-hole and the spring retention hardware and the radially extending slot can each secure a portion of the spring to the axial end face of the housing.

In another embodiment, the core retention spring features can include a pair of opposing radially extending slots and an axially extending lip feature disposed between the slots. In this manner, the slots can each receive a portion of the spring while another portion of the spring can be seated under the lip feature. In this arrangement, the slots inhibit axial and circumferential movement of the spring, and the lip feature inhibits radial movement of the spring.

In still another embodiment, the core retention spring features can include a first axially extending thru-hole and a second axially extending thru-hole opposing the first thru-hole. Both the first and the second thru-holes are each complementary to receive spring retention hardware. In this manner, the first and the second thru-holes and the corresponding spring retention hardware can secure a portion of the spring to the axial end face of the housing to inhibit axial and circumferential movement.

The spring that can be utilized in the low profile retention assembly of the various embodiments can include a core retention spring. In one embodiment, the core retention spring can include a wave spring. For example, the core retention spring can include a 360° wave spring. The 360° wave spring can be disposed against the shaped profile (e.g., the scallop-shaped profile) of the axial face of the housing with portions of the spring secured to any of the aforementioned core retention spring features that can be utilized with the housing.

In another embodiment, the core retention spring can include a plurality of spaced segmented wave springs disposed circumferentially about the axial end face of the housing. The use of the plurality of spaced segmented wave springs disposed circumferentially about the axial end face of the housing is beneficial in fitting in tight radial and axial spaces and also can provide a weight savings in comparison to the 360° wave spring. Each segmented wave spring can have a first tab leg, a second tab leg, and an active part between the first tab leg and the second tab leg. The first tab leg and the second tab leg of each segmented wave spring can be affixed to the shaped profile (e.g., the scallop-shaped profile) at the axial end face of the housing by any of the aforementioned core retention spring features that can be utilized with the housing. For example, the segmented wave springs can include thru-holes in one or more of the tab legs to mate with core retention spring features that use complementary thru-holes and spring retention hardware to secure the springs to the axial end face of the housing. In another embodiment, the tab legs can be inserted into core retention spring features that comprise radially extending slots. Regardless of the particular core retention spring features that are utilized, in certain embodiments, the active part of each of the segmented wave springs can be in direct contact with the core end ring with the tab legs secured to the scallop-shaped profile.

In addition to a weight savings, the use of the circumferentially arranged segmented wave springs reduces the amount of extraneous radial and axial material that is associated with the use of a 360° wave spring. Nonetheless, the circumferentially arranged segmented wave springs still achieves the objective of having the springs affixed to the axial face of the housing in a manner that that allows the segmented wave springs to interact with the core end ring during instances of impact loads. In this manner, the segmented wave springs in certain embodiments enable the core end ring to impart an axial load to the stator core to maintain it in axial compression during impact load instances.

In either spring embodiment, both the 360° wave spring and the plurality of segmented wave springs advance the low profile aspect of the retention assemblies described herein. That is, in certain embodiments, both springs can be applied to the shaped profile (e.g., the scallop-shaped profile) at the axial end face of the housing such that a portion of the spring(s) can interact with the core end ring during instances of impact loads to impart an axial load that maintains the stator core in axial compression. In addition, both of the spring embodiments can carry out this function in a very tight axial and radial space. In this manner, the wave springs and any spring hardware that may be utilized to secure to the springs to the housing are not near the active electrical components of the stator windings (i.e., the coils) that could cause electrical issues. Furthermore, the location of the springs in these embodiments allows for significantly more spring deflection in the axial direction which is beneficial in accommodating a wide range of differential electric machine part interface movements and growths that can occur during electric machine operation, processing and manufacture. Also, the springs not only maintain acceptable spring force during initial installation, but also can maintain acceptable force during higher temperature operation when thermal mismatches between the housing, the core end ring, and the stator core can occur.

The low profile retention assembly of the various embodiments can further include an outer housing to house the housing containing the shaped profile (e.g., the scallop-shaped profile) and the core retention spring features disposed at its axial end face. In one embodiment, this outer housing can extend over the inner housing containing the shaped and the core retention spring features, as well as the spring (i.e., the 360° spring or segmented springs) disposed at its axial end face. In this manner, the outer housing traps the spring thereunder, inhibiting outboard radial movement of the spring. The use of the outer housing in conjunction with the shaped profile and the core retention spring features on the axial end face of the inner housing ensures that the low profile retention assembly of the various embodiments inhibits any freedom of movement for the spring in a circumferential, radial and axial direction.

In accordance with one embodiment of the present invention, a retention assembly for retention of a stator core in a stator of an electric machine is provided. The retention assembly comprises: a first housing to house the stator core, the first housing having an axial end face with a circumferentially extending, shaped profile having recessed portions that project axially inward from the axial end face of the housing alternating with non-recessed portions, wherein a portion of the stator core extends axially outward from the shaped profile at the axial end face of the first housing beyond the recessed portions; and a core retention spring disposed circumferentially at the axial end face of the first housing, the core retention spring having direct contact with the portion of the stator core that extends axially outward from the shaped profile of the first housing and the shaped profile of the first housing, wherein the core retention spring pushes against the portion of the stator core that extends axially outward from the shaped profile of the first housing, imparting one or more of an axial load and a radial load into the stator core that maintains the stator core in axial and/or radial compression.

In accordance with another embodiment, a retention assembly for retention of a stator core in a stator of an electric machine is provided. The retention assembly comprises: a core end ring circumferentially disposed at an axial end of the stator core; an inner housing to house the stator core and the core end ring, the inner housing having an axial end face with a circumferentially extending scallop-shaped profile, wherein a portion of the core end ring extends axially out from the scallop-shaped profile at the axial end face of the inner housing; and a core retention spring including a plurality of segmented core retention springs disposed circumferentially at the axial end face of the inner housing, each segmented core retention spring contained by the axial end face of the inner housing to inhibit circumferential and radial movement of the core retention spring, wherein each segmented core retention spring has direct contact with the portion of the core end ring that extends axially out from the scallop-shaped profile of the inner housing, each segmented core retention spring pushing against the core end ring, imparting one or more of an axial load and a radial load into the stator core, wherein the axial load and/or the radial load imparted into the stator core by all of the plurality of segmented core retention springs via the core end ring maintains the stator core in axial compression and/or radial compression.

In accordance with third embodiment, an electric machine is provided. The electric machine comprises: a stator core having a plurality of axially oriented slots extending radially from a central axis of the stator core with a plurality of stator winding coils disposed in the slots; an inner housing to house the stator core, the inner housing having an axial end face with a circumferentially extending scallop-shaped profile, wherein a portion of the stator core extends axially out from the scallop-shaped profile at the axial end face of the inner housing; a core retention spring disposed circumferentially at the axial end face of the inner housing, the core retention spring having direct contact with the portion of the stator core that extends axially outward from the scallop-shaped profile of the inner housing and the scallop-shaped profile of the inner housing, wherein the core retention spring pushes against the portion of the stator core that extends axially out from the scallop-shaped profile of the inner housing, the core retention spring imparting one or more of an axial load and a radial load into the stator core that maintains the stator core in axial and/or radial compression; and an outer housing to house the inner housing, the outer housing extending over the inner housing and the core retention spring, wherein the outer housing traps the core retention spring thereunder, inhibiting outboard radial movement of the core retention spring.

DRAWINGS

The present invention will be better understood from reading the following description of non-limiting embodiments, with reference to the attached drawings, wherein below:

Figure 9:
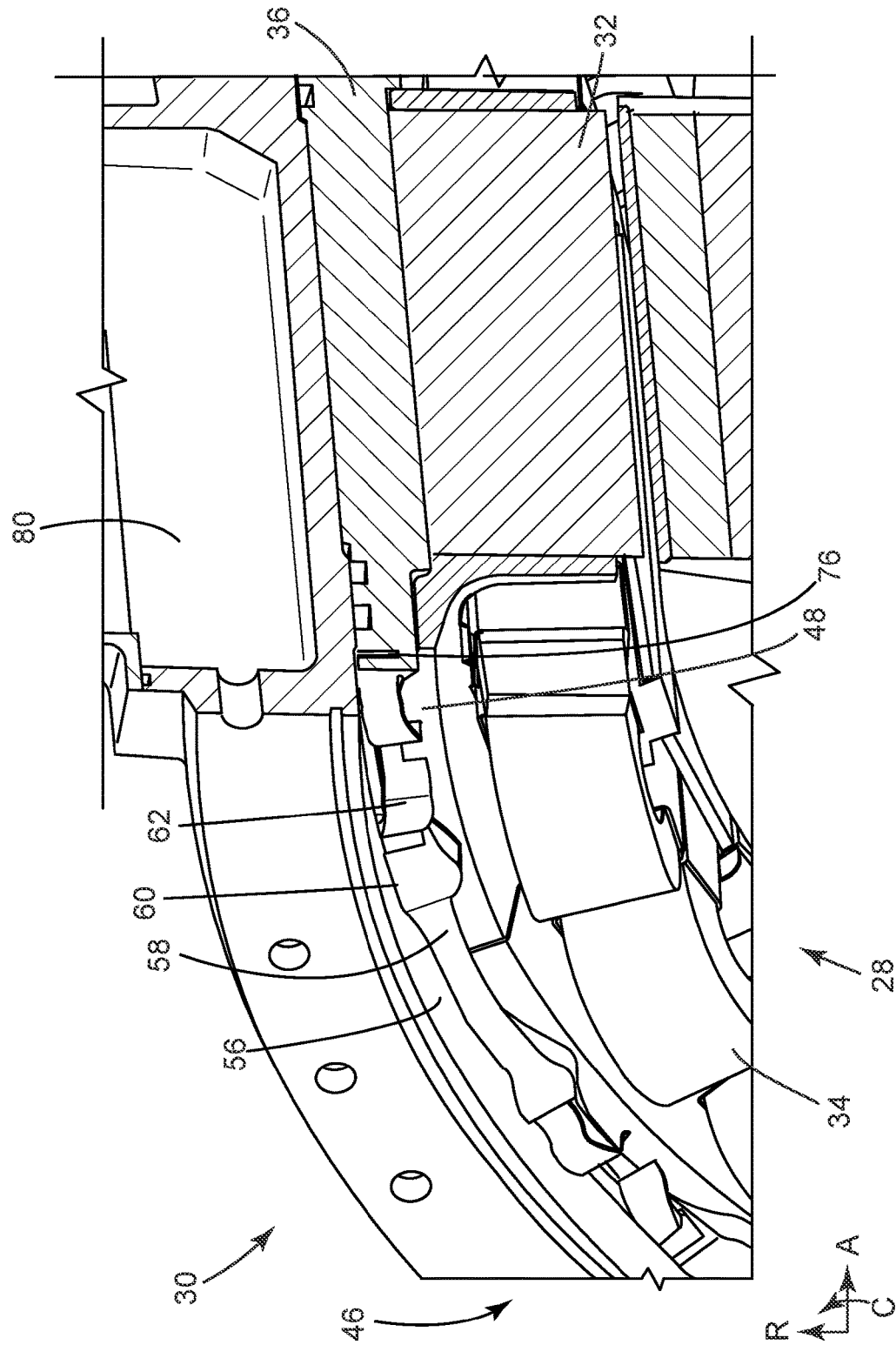

FIG. 9 shows a schematic of a perspective, cross-sectional view of a portion of a stator with an outer housing that can form part of a retention assembly for retention of a stator core in an electric machine according to an embodiment of the invention; and FIG. 10 shows a schematic of a perspective view of a portion of an axial end face of an inner housing with a 360° spring disposed on a scallop-shaped profile of the end face in contact with a core ring according to an embodiment of the invention.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to electric machines such as generators and motors, and more specifically, to low profile retention assemblies for providing one or more of axial and radial load retention of a stator core in an electric machine that has utility in applications where it is desirable to have the machines compact and lightweight. Transportation applications that can include automotive, aerospace and other modes of transportation are non-limiting examples in which compact and lightweight electric machines can be deployed. In these applications, there is typically not enough radial and axial space in the housing of the electric machines that contains the stator core to dispose a stator core retention device such as for example a spring that can facilitate an axial force and a radial force into the core, so that it can withstand transient conditions that arise due to the different temperatures and/or environmental impact loads. The low profile stator core retention assemblies of the various embodiments require less axial and radial space, and thus are suitable for electric machines that are compact and lightweight, and in particular, with machines that have their stator cores in housings with tight axial and radial space constraints. As used herein, an electric machine with tight axial space and radial space constraints means an electric machine with a compressed axial and radial envelop that is restricted in its height and width to accommodate a stator core retention device (e.g., a spring), while meeting a minimum electrical clearance requirement between the copper coil windings of the stator core and the retention device to prevent electrical insulation reliability issues.

Although the various embodiments are described with respect to electric machines that are compact and lightweight with tight axial space and radial space constraints, these embodiments can have utility with other electric machines such as larger electric machines that do not have tight axial space and radial space constraints, but still require retention of a stator core in order to compensate for transient conditions that can affect proper operation of the electric machines.

Throughout the discussion that follows, a set of axes will be referenced. These axes are based on a cylindrical coordinate system and point in an axial direction A, a radial direction R, and a circumferential direction C that extends around a longitudinal axis that aligns with the axial direction A. For example, the axial direction A extends along the longitudinal axis of the stator (e.g., a central axis of the stator), the radial direction R extends transversely away (e.g., perpendicularly) from the longitudinal axis, and the circumferential direction C extends around the longitudinal axis.

Figure 1:
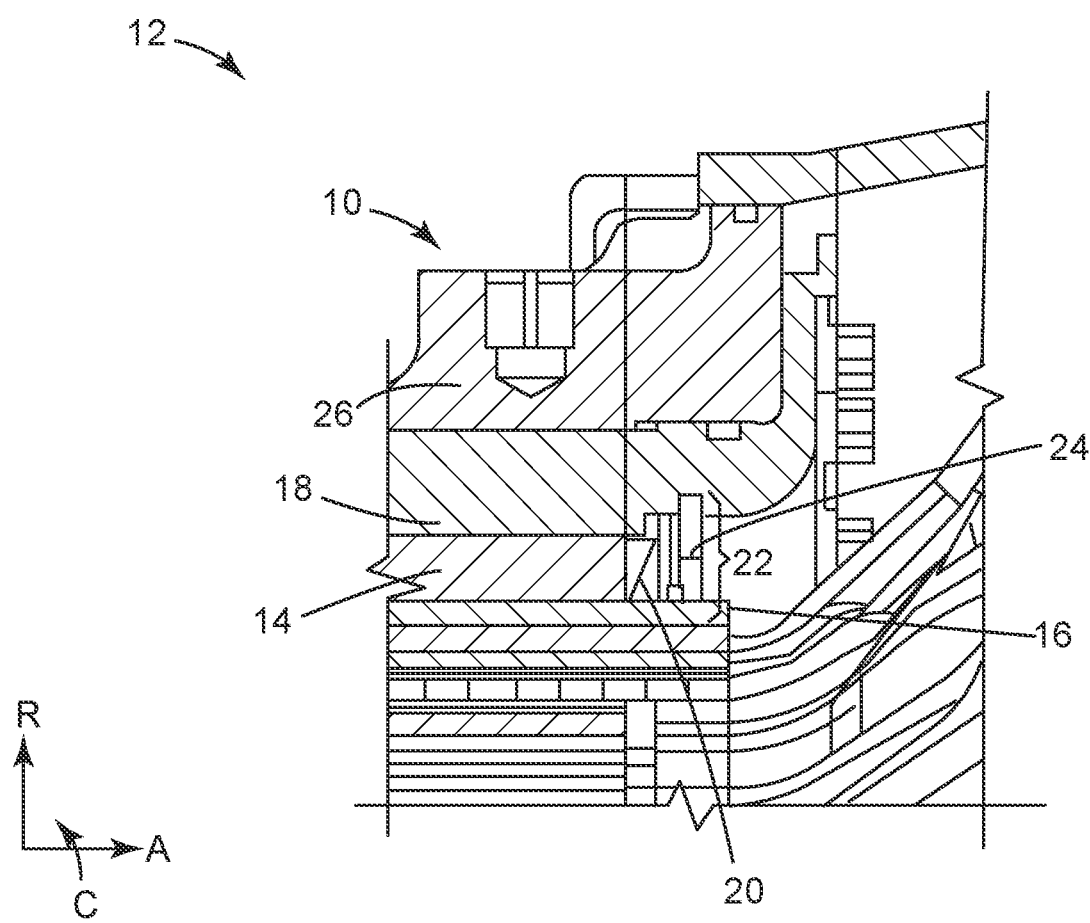
FIG. 1 shows a cross-sectional view of a portion of a stator of an electric machine according to the prior art.

Turning now to the figures, FIG. 1 shows a cross-sectional view of a portion of a stator 10 of an electric machine 12 according to the prior art. This cross-sectional view of the stator 10 of the electric machine 12 in FIG. 1 shows a stator core 14, which can include stacked laminations (e.g., magnetic steel sheets) that encases stator windings and coils 16 enclosed in an inner housing 18. A spring 20 is disposed in a slot 22 formed in the inner housing 18. A core end ring 24 is disposed in the slot 22 to retain the stator core 14 and the spring 20 in the inner housing 18. An outer housing 26 encloses the inner housing 18 to maintain the retention of the stator core 14, the spring 20, and the core end ring 24 within the inner housing. To this extent, the inner housing 18, the spring 20, the core end ring 24 and the outer housing 26 can act in concert to maintain an axial load and a radial load on the stator core 14 for retention of the core during operation, processing, and manufacture of the electric machine 12. This allows the stator core 14 to withstand the different temperatures and/or environmental impact loads that can arise during these instances.

In the electric machine 12 depicted in FIG. 1, the stator 10 does not have tight axial space and radial space constraints that would preclude the use of the spring 20 and the core end ring 24 in the slot 22 formed in the inner housing 18. As a result, the spring 20 can be used to push directly against the stator core 14 to maintain an axial force into the core so that it can withstand impact loads. As noted above, electric machines that have the primary design requirements of compact sizing and weight savings typically do not have the axial and radial space in the inner housing to accommodate a spring that can maintain an axial force into the stator core. In particular, because these electric machines have such tight axial and radial space constraints, there is not enough mechanical or electrical clearance room to accommodate a spring in the inner housing that can push directly against the stator core to maintain it in axial compression to handle transient conditions that can arise during operation, processing, and manufacture of the machines.

Figure 2:
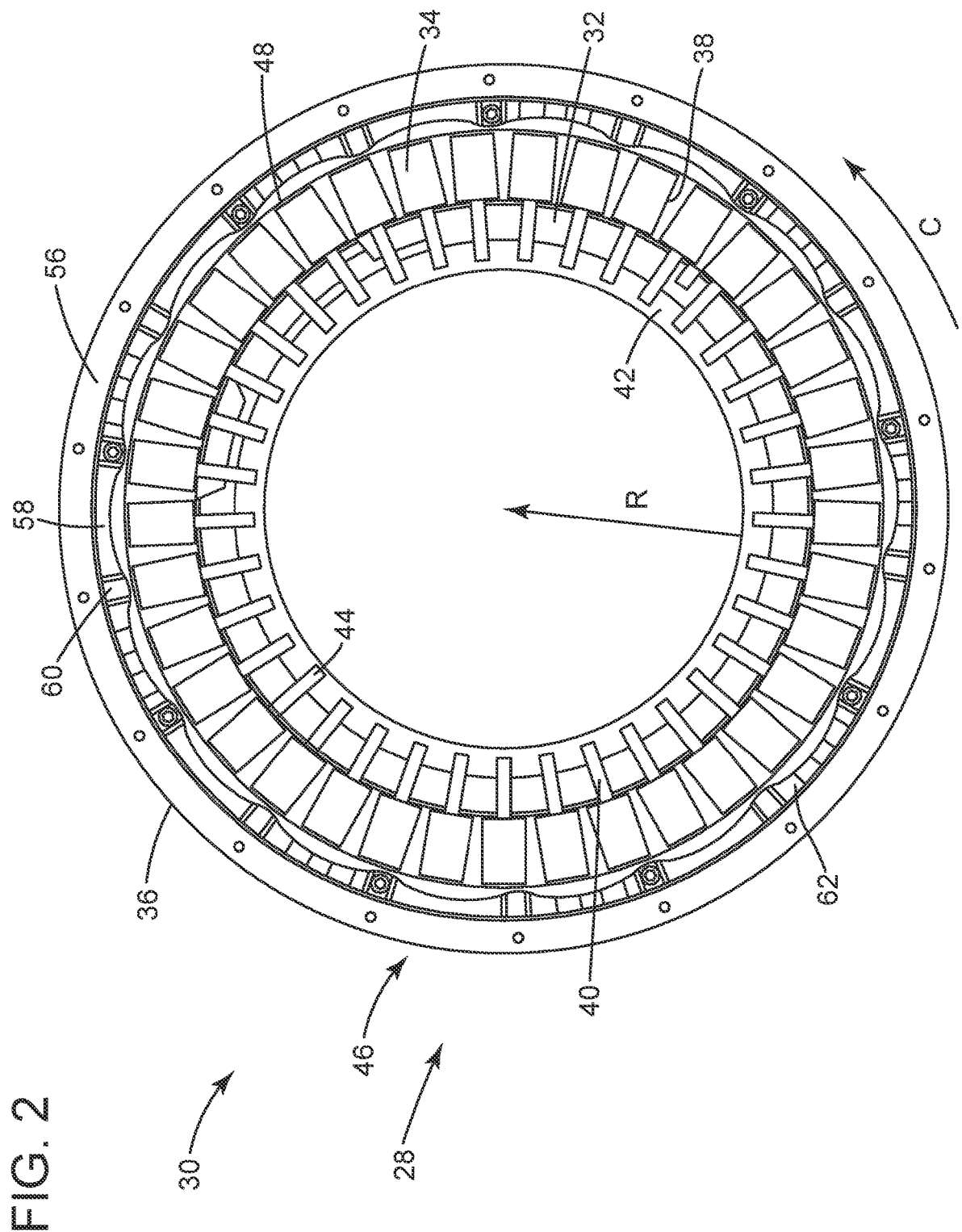
FIG. 2 shows a schematic of an elevational view of a stator end according to an embodiment of the invention.

FIG. 2 shows a schematic of an elevational view of an end of a stator 28 for an electric machine 30 such as a generator or a motor that has tight radial and axial space constraints for implementing a spring in an inner housing. Like the stator core 14 of the stator 10 in the electric machine 12 depicted in FIG. 1, the stator 28 of the electric machine 30 shown in FIG. 2 includes a stator core 32 of stacked laminations that encases stator windings and coils 34 (collectively the "stator winding coils 34") enclosed in an inner housing 36 (e.g., a cooling jacket). In one embodiment, the stator core 32 can include a plurality of axially oriented slots 38 extending radially from a central axis of the stator core (a longitudinal axis extending through the center of the stator) with a plurality of stator winding coils 34 disposed in the slots. After the stator winding coils 34 are disposed in the slots 38, a plurality of stator core wedges 40 are placed in dovetails (not shown) formed in the stator 28. The stator core wedges 40 hold the stator winding coils 34 in the slots 38 and inhibit radial movement to prevent the coils from coming out of the slots. A phase ring connection or bus-bar 42 interconnects leads 44 from the various stator winding coils 34. Acting as an electrical conductor, the phase ring connection or bus-bar 42 links the leads 44 of the stator winding coils 34 to the desired electrical circuits that comprise the phases.

The electric machine 30 can further include a retention assembly 46 for retention of the stator core 32 within the tight radial and axial space constraints that are associated with the machine depicted in FIG. 2. In one embodiment, the retention assembly 46 can include a core end ring 48 circumferentially disposed at an axial end of the stator core 32 to retain the core in the inner housing 36 and provide insulation material that is used for electrical clearance. In addition to retaining the stator core 32 in the inner housing 36, the core end ring 48 can serve as the part of the retention assembly 46 that can impart one or more of an axial load and a radial load into the stator core 32 that can maintain the stator core in axial and/or radial compression to withstand different temperatures and/or environmental impact loads that can arise during operation, processing, and manufacture of the electric machine 30.

Figure 3:
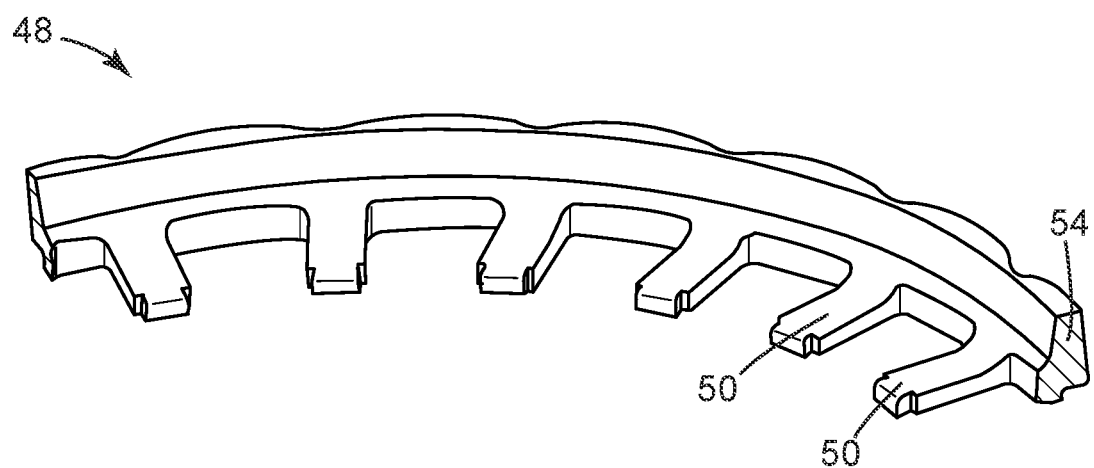
FIG. 3 shows a schematic of a perspective view of a portion of a core end ring depicted in FIG. 2 that can retain a stator core in a housing of the stator according to an embodiment of the invention.

Further details of the core-end ring 48 are shown in FIG. 3. As shown in FIG. 3, the core-end ring 48, which can include a non-metallic material such as a plastic, can include a plurality of coil form preservation features 50 that are configured to correspondingly extend between the plurality of slots 38 at the axial end of the stator core 32. FIG. 3 also shows that the core-end ring 48 can include a ledge feature 54 that protrudes outward from the plurality of coil form preservation features 50. With the core-end ring 48 circumferentially disposed at an axial end of the stator core 32, the ledge feature 54 will protrude axially outward from the axial end face of the 36 as shown in FIG. 2.

Referring back to FIG. 2, another part of the retention assembly 46 can include an axial end face 56 of the inner housing 36. In one embodiment, the axial end face 56 of the inner housing 36 includes a circumferentially extending, shaped profile having recessed portions 58 that project axially inward from the axial end face of the housing alternating with non-recessed portions 60. For example, the shaped profile of alternating recessed portions 58 and non-recessed portions 60 can include a scallop-shaped profile having a plurality of spaced scallop-shaped (i.e., a curve or semi-circle) surfaces formed on the axial end face 56 of the inner housing 36. With the shaped profile (e.g., the scallop-shaped profile) at the axial end face 56 of the inner housing 36, a portion of the core end ring 48 can extend axially outward from the shaped profile at the axial end face beyond the recessed portions. In particular, portions of the ledge feature 54 (FIG. 3) of the core-end ring 48 can extend axially outward beyond the recessed portions (e.g., scallop-shaped surfaces) 58.

The retention assembly 46 can further include a core retention spring 62 disposed circumferentially at the axial end face 56 of the inner housing 36. The core retention spring 62 can have direct contact with the core end ring 48 and the shaped profile of the inner housing 36. In essence, the ledge feature 54 of the core-end ring 48 is in a spring loaded connection with the core retention spring 62. This allows the core retention spring 62 to push against the core end ring 48, imparting or putting a force such as an axial load into the stator core 32 that maintains the core in an axial compression that can be a constant compression or a compression that changes or varies. This allows the stator core 32 to withstand different temperatures and/or environmental impact loads that can arise during operation, processing and manufacture of the electric machine 30.

In one embodiment, the core retention spring 62 can be implemented in the retention assembly 46 as a segmented core retention spring comprising a plurality of segmented core retention springs. For example, the segmented core retention springs 62 can comprise segmented wave springs disposed about the shaped profile (e.g., the scallop-shaped profile) at the axial end face 56 of the inner housing 36. In one embodiment, each of the segmented wave springs can be disposed at selected recessed portions 58 (e.g., the scallop-shaped surfaces) on the axial end face 56 of the inner housing 36 to facilitate the spring load connection with the core retention spring 62. In one embodiment, the segmented wave springs can be disposed at alternating recessed portions 58. Those skilled in the art will appreciate that this implementation of the segmented wave springs is representative of only one possible arrangement of springs and is not meant to be limiting. For example, it is possible that the segmented wave springs can be disposed at all of the recessed portions 58 on the axial end face 56 of the inner housing 36.

Figure 4:
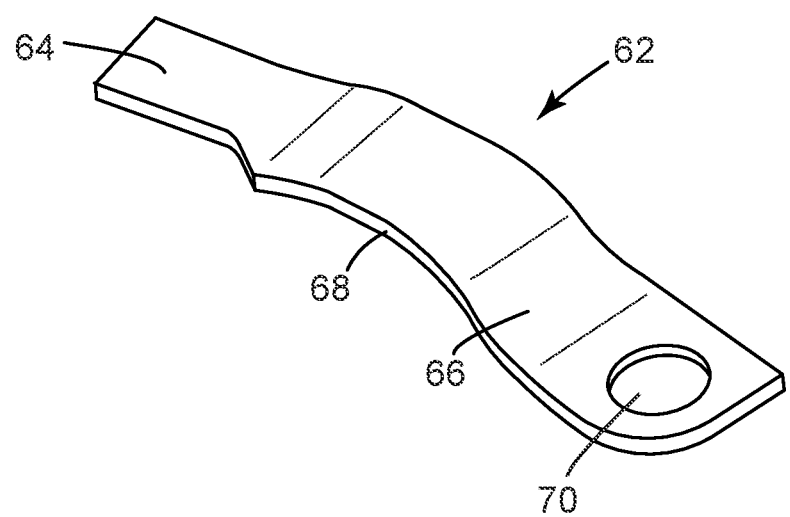
FIG. 4 shows a schematic of a perspective view of a core retention spring that can be part of a retention assembly for retention of a stator core in an electric machine according to an embodiment of the invention.

FIG. 4 shows a schematic of a perspective view of one of the segmented core retention springs 62 according to an embodiment that can include a wave spring. As shown in FIG. 4, each segmented core retention spring 62 can include a first tab leg 64, a second tab leg 66, and an active part 68 between the first tab leg and the second tab leg. The first tab leg 64 and the second tab leg 66 of each segmented core retention spring 62 can be affixed to a portion of the shaped profile (i.e., one of the recessed portions 58 at the axial end face 56 of the inner housing 36), and the active part 68 of the segmented core retention spring can be in direct contact with the core end ring 48 to facilitate the spring load connection.

In one embodiment, as shown in FIG. 4, each segmented core retention spring 62 can include a thru-hole 70 in one or more of the first tab leg 64 and the second tab leg 66. The thru-hole 70 can be complementary to receive spring retention hardware therein to secure one of the first tab leg 64 and the second tab leg 64 to the axial end face 56 of the inner housing 36. It is understood that the segmented core retention spring 62 depicted in FIG. 4 is representive of only one segmented wave spring that can be disposed about the axial end face 56 of the inner housing 36. For example, the segmented wave springs can have two thru holes 70 disposed at both the first tab leg 64 and the second tab leg 66. In this arrangement, each thru-hole 70 is complementary to receive spring retention hardware therein to secure the first tab leg 64 and the second tab leg 66 to the axial end face 56. In another embodiment, the segmented wave springs can have no thru-holes disposed on either the first tab leg 64 or the second tab leg 66. In this arrangement, the first tab leg 64 and the second tab leg 66 can be disposed and secured in core retention spring features disposed on the axial end face 56 of the inner housing 36.

For purposes of clarity in describing the retention assembly 46 and the components thereof that are relevant to the various embodiments delineated herein, other components that can form part of the electric machine 30 are not depicted in FIG. 2 as well as FIGS. 5-10. For example, the electric machine 30 can include a rotor and a rotor shaft mounted within the stator 28. The rotor can be wrapped in field windings which produce a constant magnetic field that can interact with the stator winding coils 34 which can be fed by a system of three-phase AC voltages.

Figure 5:
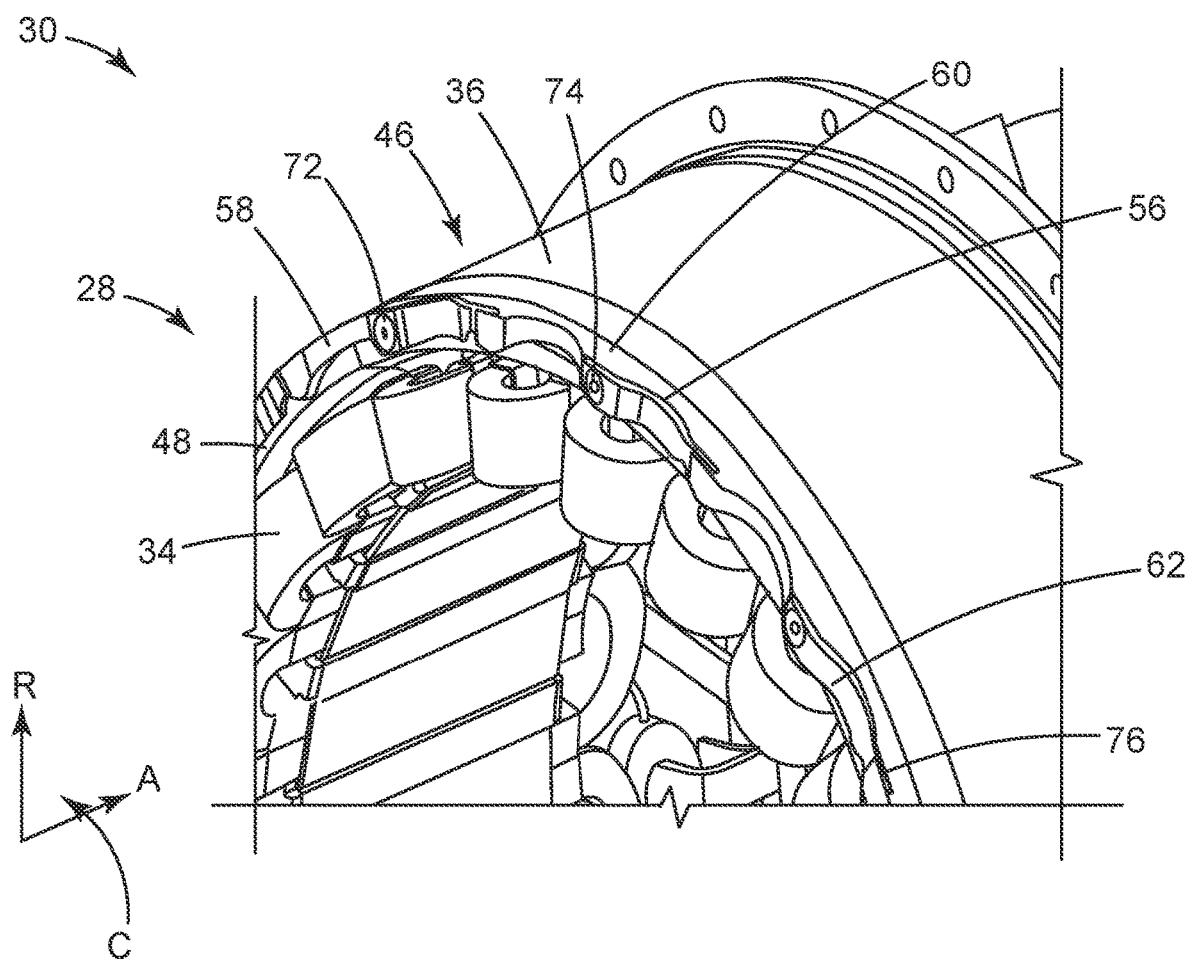
FIG. 5 shows a schematic of a perspective view of a portion of the stator end depicted in FIG. 2 according to an embodiment of the invention.
Figure 6A:
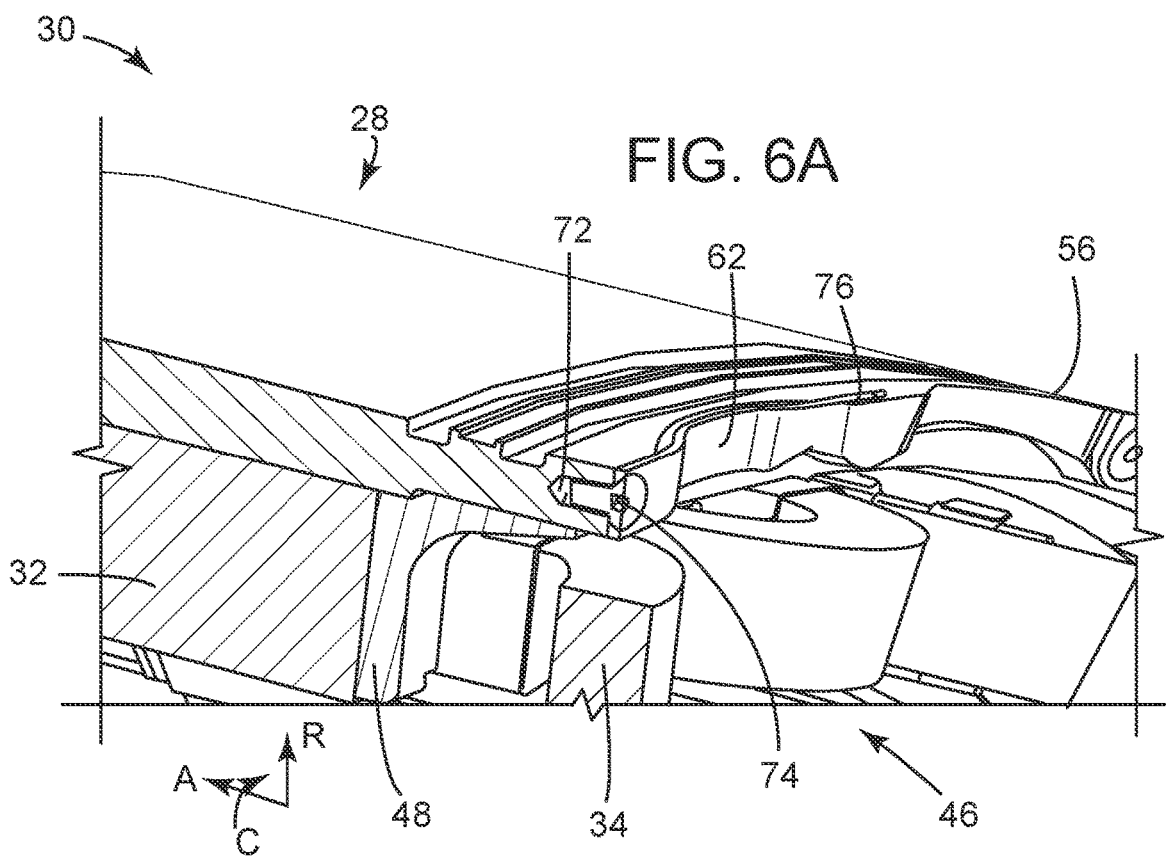
FIGS. 6A and 6B show schematics of perspective, cross-sectional views detailing portions of an axial end face of an inner housing in the stator depicted in FIG. 2 that can form part of a retention assembly for retention of the stator core in an electric machine according to embodiments of the invention.
Figure 6B:
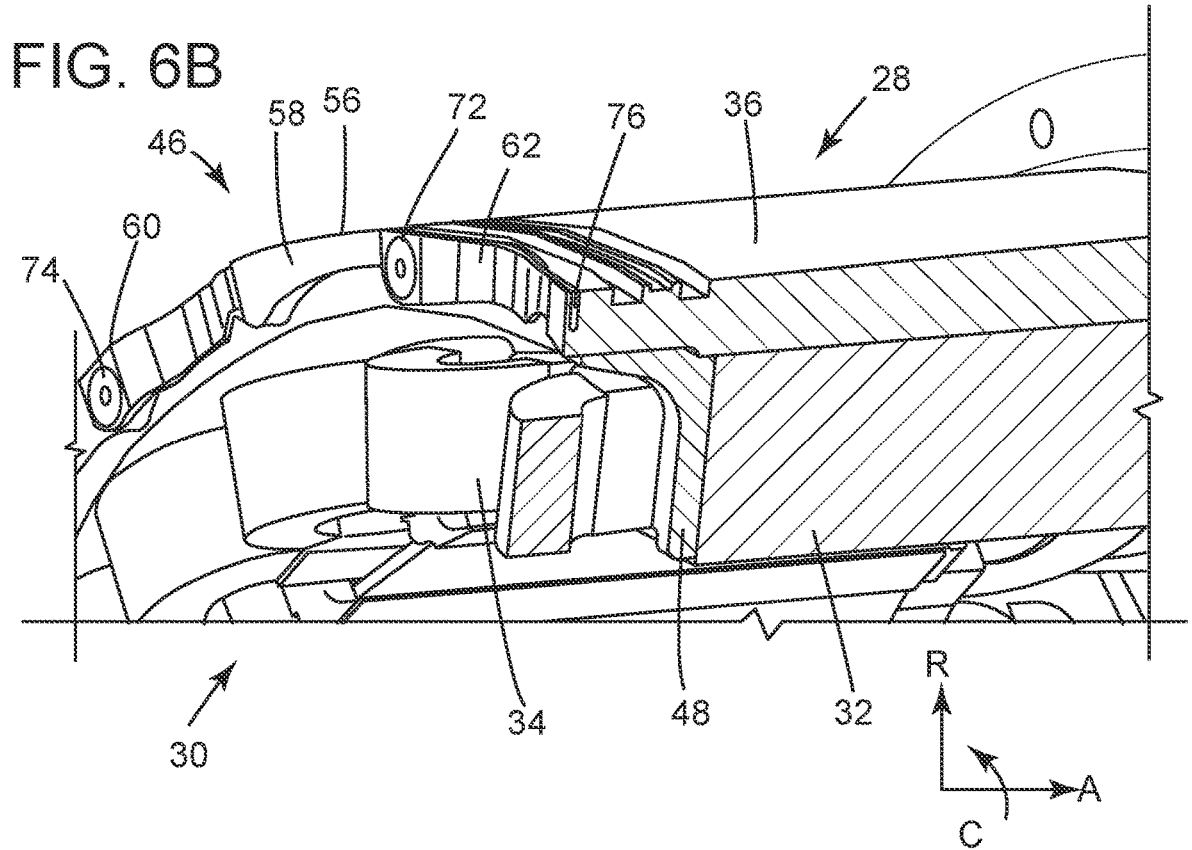
Figure 7:
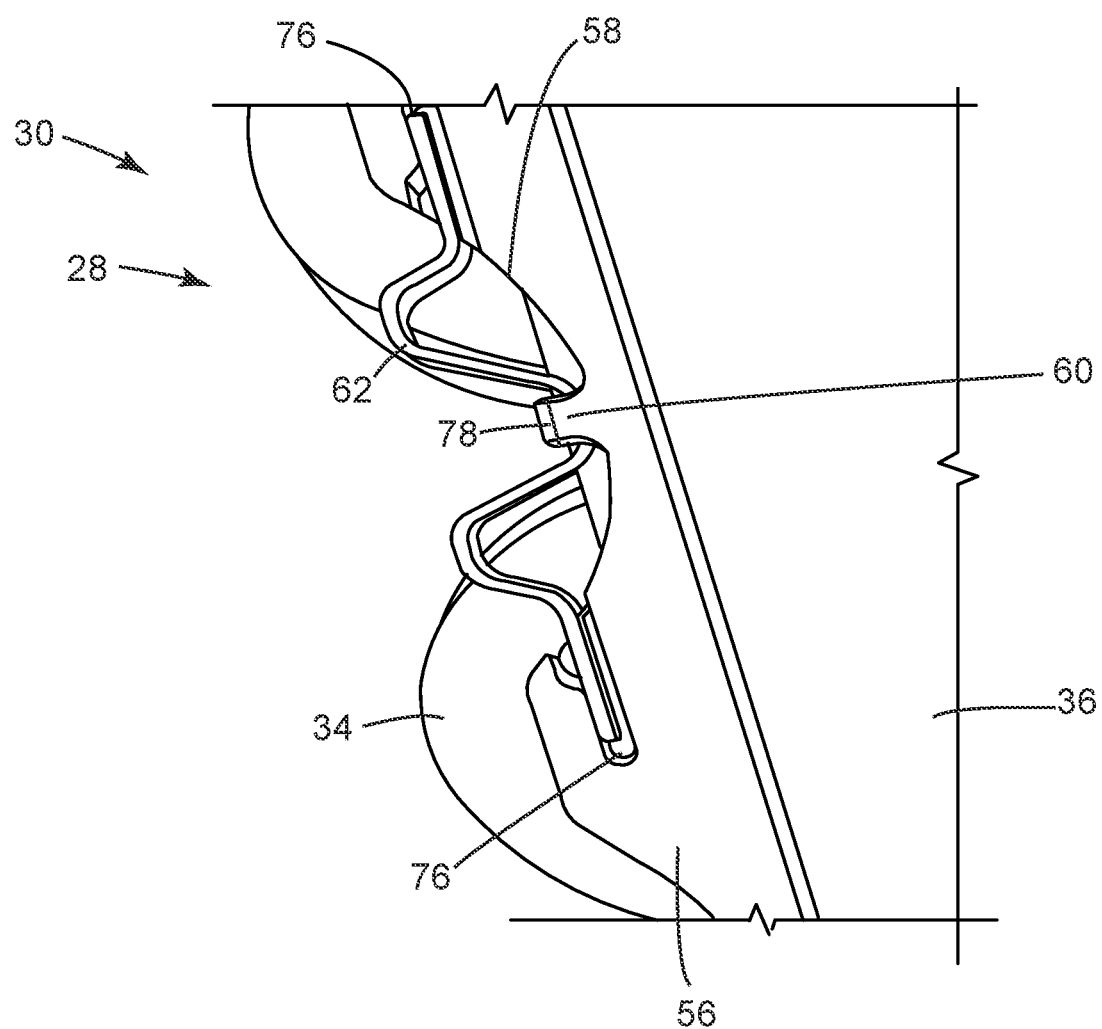
FIG. 7 shows a schematic of a top view of a core retention spring secured to core retention spring features disposed in the axial end face of an inner housing that can form part of the retention assembly for retention of the stator core in an electric machine according to an embodiment of the invention.
Figure 8:
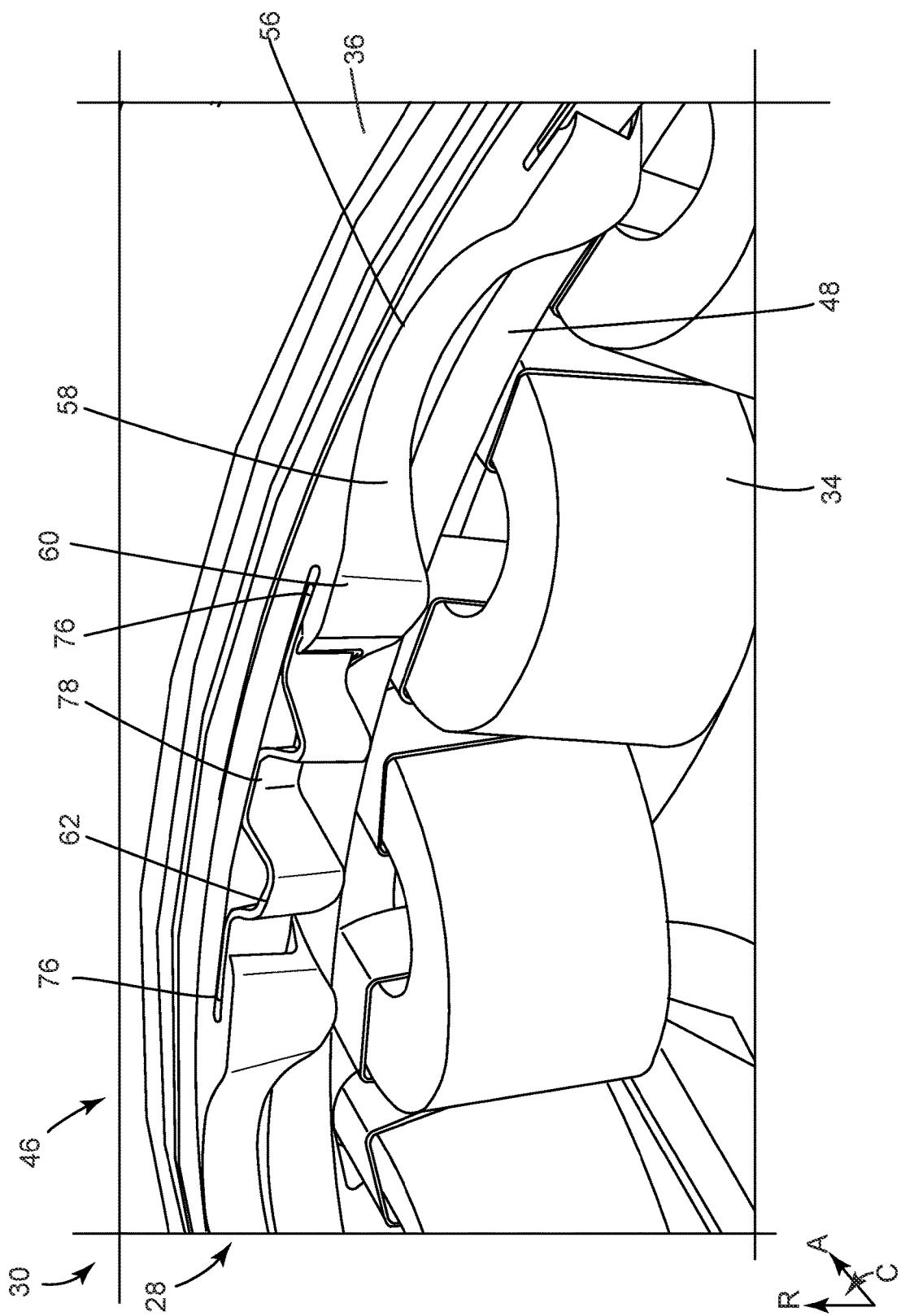
FIG. 8 shows a schematic of a perspective view of a portion of an axial end face of an inner housing with more details of a retention assembly for retention of a stator core in an electric machine according to an embodiment of the invention.

Further details of the retention assembly 46 for retention of the stator core 32 in the electric machine 30 including the core end ring 48, the axial end face 56 of the inner housing 36, and the core retention spring 62 according to one embodiment are now discussed in relation to FIGS. 5-10. Referring now to FIGS. 5 and 8, these figures show further details of the aspect of the retention assembly 46 that pertains to the geometry at the axial end face 56 of the inner housing 36 that allows the core end ring 48 to sit proud in this tight axial and radial space near this face of the housing, and not be sunken or nested entirely in the housing. For example, FIGS. 5 and 8 show portions of the core end ring 48 (i.e., parts of the ledge feature 54 (FIG. 3)) that extend axially outward from the shaped profile of the axial end face 56 of the inner housing 36. In particular, these portions of the core end ring 48 extend axially outward from the recessed portions 58 of the axial end face 56 of the inner housing 36. With these portions of the core end ring 48 extending axially outward from the recessed portions 58, the segmented core retention springs 62 disposed at selected recessed portions 58 on the axial end face 56 of the inner housing 36 can be placed on these portions of the core end ring 48 to have direct contact therewith in order to facilitate the spring loaded connection between the two components. To this extent, the segmented core retention springs 62 can press against those selected axially extend portions of the core end ring 48 during the occurrence of impact loads. The pressing of the segmented core retention springs 62 against the core end ring 48 results in a force (an axial load) imparted to the stator core 32 such that the primary load path of the force to the core is through the core end ring. As a result, the force imparted to the stator core 32 can maintain the core in axial compression during instances of impact loads where there is a tendency for the stator core to want to translate, deflect, or detach relative to the housing.

FIGS. 5 and 8, as well as FIGS. 6A, 6B, 7, and 9 show further details of core retention spring features that can be disposed on the axial end face 56 of the inner housing 36 to secure the core retention springs 62. In one embodiment, the core retention spring features of the retention assembly can be disposed at the shaped profile of the axial end face 56 of the inner housing 36 by machining. For example, the shaped profile of the axial end face 56 can form an alternating pattern of recessed portions (e.g., scallop-shaped surfaces) with core retention spring features and recessed portions without core retention spring features.

In one embodiment, as shown in FIGS. 5, 6A and 6B, the core retention spring features disposed at the shaped profile of the axial end face 56 of the inner housing 36 can comprise an axially extending thru-hole 72 (e.g., a threaded hole) complementary to receive spring retention hardware 74 therein and a radially extending spring retention slot or channel 76 formed in the axial end face that opposes the thru-hole. The thru-hole 72 and the spring retention hardware 74 can secure a portion of the core retention spring 62 to the axial end face 56 of the inner housing 36 and the radially extending spring retention slot 76 can receive another portion of the core retention spring therein to secure that portion to the axial end face of the first housing.

The spring retention hardware 74 can include any of a number of well-known fasteners that can facilitate mechanical connections between two parts. For example, the spring retention hardware 74 can include a screw, a bolt, a pin, an insert, a rivet, and the like. In addition to these examples of fasteners, other approaches can be used to secure the core retention spring 62 to the axial end face 56 of the inner housing 36. A non-exhaustive listing of these other approaches include bonding (e.g., adhesive) and welding (e.g., tack welding).

In another embodiment, as shown in FIGS. 7, 8 and 10, the core retention spring features disposed at the shaped profile of the axial end face 56 of the inner housing 36 can comprise a pair of opposing radially extending spring retention slots 76 and an axially extending lip or ledge feature 78 disposed between the slots. In this configuration, each spring retention slot 76 is configured to receive a portion of the core retention spring 62 therein. This inhibits axial and circumferential movement of the respective core retention spring. A portion of the active part of the core retention spring 62 is seated underneath and in contact with the axially extending lip feature 78. In this manner, the axially extending lip feature 78 radially captures the portion of the active part of the core retention spring 62 seated underneath. Thus, the spring retention slots 76 and the axially extending lip feature 78 serve to inhibit circumferential, radial and axial movement of the segmented core retention spring 62.

The core retention spring features depicted in the figures are illustrative of only a few possibilities, and are not meant to be limiting to the various embodiments. In one embodiment, the core retention spring features can include two thru-holes 72 instead of just one. For example, a first axially extending thru-hole 72 can be formed in a location in a recessed portion 58 of the axial end face 56 of the inner housing 36, while a second axially extending thru-hole 72 can be formed at an opposing end of the recessed portion. In this configuration, both the first and the second thru-holes 72 can be complementary to receive spring retention hardware 74 therein. In this manner, the first and the second thru-holes 72 and the corresponding spring retention hardware can secure a portion of the core retention spring 62 to the axial end face 56 of the inner housing 36, inhibiting axial and circumferential movement of the segmented core retention spring 62.

FIGS. 2, 5, 6A, 6B, 7, 8, and 9 show that the core retention spring 62 can include segmented core springs such as wave springs, but as noted above and depicted in FIG. 10, the core retention spring can include a 360° spring such as a 360° wave spring. As shown in FIG. 10, the 360° wave spring can be disposed at the shaped profile of the axial end face 56 of the inner housing 36. For example, the 360° wave spring can be disposed all along on the shaped profile of the axial end face 56 including the recessed portions 58 (e.g., scalloped surfaces) and non-recessed portions 60. In one embodiment, as shown in FIG. 10, the 360° wave spring can be secured to the axial end face 56 of the inner housing 36 using any of the aforementioned spring retention hardware 74. For example, the spring retention hardware 74 be secured to the non-recessed portions 60 on the shaped profile of the axial end face 56.

Although FIG. 10 shows the use of spring retention hardware 74 to secure the 360° wave spring to the axial end face 56 of the inner housing 36, it is understood that other core retention spring features can be used to secure the 360° wave spring. For example, the 360° wave spring can be secured in radially extending spring retention slots 76 disposed along the axial end face 56 of the inner housing 36 in the manner previously described. Also, these other core retention spring features can include an axially extending lip feature 78 to provide positive radial outboard retention of the spring, which complements the axial and circumferential retention of the spring that is provided by the spring retention slots 76. It is understood that the 360° wave spring can be secured to the axial end face 56 of the inner housing 36 by using any of the other previously mentioned approaches including, but not limited to, bonding and welding.

An additional amount of positive radial outboard retention of the core retention spring 62 can be provided by the retention assembly 46 by utilizing an outer housing to house the inner housing 36 containing the shaped profile and the core retention spring features. For example, FIG. 9 shows an outer housing 80 extending over the inner housing 36 and the segmented core retention spring 62. In this manner, the outer housing 80 can trap or contain the core retention spring 62 thereunder, inhibiting outboard radial movement of the spring. In particular, by covering the radially extending spring retention slots 76, the outer housing 80 can contain the segmented core retention spring 62 and inhibit outboard radial movement of the spring, further supplementing the radial movement inhibition that can be provided with the use of an axially extending lip feature 78 (FIGS. 7 and 8).

The retention assemblies depicted in FIGS. 2, 5, 6A, 6B, 7, 8, 9, and 10 are not meant to be limiting, as other approaches can be implemented to provide axial load and/or radial load retention of a stator core in an electric machine. For example, in one embodiment, a low profile retention assembly can be implemented without the use of the core end ring 48. In this embodiment, the stator core 32 at the axial end face 56 of the housing 36 can be shaped to exhibit features that correspond with the shape and characteristics of the core end ring at this location. For example, using FIG. 9 as a reference, the axial face of the stator core 32 can be formed to take on the shape of the core end ring at this location, i.e., adding onto the axial end face portion of the stator core shown in this figure to obviate the use of the core end ring 48. In this manner, the core retention spring 62 can be used to press or push directly into those features of the stator core that are shaped to correspond with those of the core end ring. The pressing or pushing of the core retention spring 62 into those features can impart an axial load into the stator core.

In another embodiment, a low profile retention assembly can be provided to impart one or more of a radial load and an axial load into the stator core. For example, the stator core 32 and the core end ring 48 at the axial end face 56 of the housing 36 can be configured to have an angled surface (e.g., a tapered surface) formed between these components. Depending on the angled surface, the application of the core retention spring 62 to the surface can generate a resultant force vector into the surface that can be resolved as a radial load, an axial load, or both. As a result, these loads can be imparted to the stator core 32 to maintain it in a corresponding load compression.

From the description of the embodiments presented herein, it should be evident that the subject disclosure sets forth an effective solution that addresses the challenges associated with smaller and lighter electric machines that lack the axial and radial space to deploy a spring such as a 360° spring in an inner housing that contains the stator core in order to withstand impact loads that can arise during operation, processing and manufacture of the machines. The solutions provided by the retention assemblies of the various embodiments entail utilizing an axial face of the inner housing to receive a spring. In this manner, the spring can press or push against portions of the core end ring or stator core that extend radially from the axial face. The pressing or pushing of the spring against these portions of the core end ring or the stator core imparts a force (an axial load and/or a radial load) into the stator core. This force can maintain the stator core in axial and/or radial compression.

The use of the retention assemblies described herein provides several benefits. For example, the low profile retention assemblies facilitate the manufacture and production of electric machines that have compact sizing and weight savings as primary design requirements. In addition, the retention assemblies of the various embodiments allow for significantly more spring deflection in the axial direction which is beneficial in accommodating a wide range of differential electric machine part interface movements and growths that can occur during electric machine operation, processing and manufacture. Also, the springs of the retention assemblies not only maintain acceptable spring force during initial installation, but also can maintain acceptable force during higher temperature operation when thermal mismatches between the housing, the core end ring, and the stator core can occur.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property. Moreover, articles "a" and "an" as used in the subject specification and annexed drawings should generally be construed to mean "one or more" unless specified otherwise or clear from context to be directed to a singular form.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A retention assembly for retention of a stator core in a stator of an electric machine, comprising: a first housing to house the stator core, the first housing having an axial end face with a circumferentially extending, shaped profile having recessed portions that project axially inward from the axial end face of the housing alternating with non-recessed portions, wherein a portion of the stator core extends axially outward from the shaped profile at the axial end face of the first housing beyond the recessed portions; and a core retention spring disposed circumferentially at the axial end face of the first housing, the core retention spring having direct contact with the portion of the stator core that extends axially outward from the shaped profile of the first housing and the shaped profile of the first housing, wherein the core retention spring pushes against the portion of the stator core that extends axially outward from the shaped profile of the first housing, imparting one or more of an axial load and a radial load into the stator core that maintains the stator core in axial and/or radial compression.

The retention assembly of the preceding clause, wherein the shaped profile of the first housing comprises a scallop-shaped profile having a plurality of spaced scallop-shaped surfaces formed on the axial end face of the first housing and a plurality of axially and radially extending core retention spring features, the plurality of core retention spring features arranged at selected scallop-shaped surfaces, wherein the-scallop-shaped profile forms an alternating pattern of scallop-shaped surfaces with core retention spring features and scallop-shaped surfaces without core retention spring features.

The retention assembly of any of the preceding clauses, wherein the plurality of core retention spring features comprises an axially extending thru-hole complementary to receive spring retention hardware therein and a radially extending spring retention slot opposing the thru-hole, the thru-hole and the spring retention hardware securing a portion of the core retention spring to the axial end face of the first housing and the radially extending spring retention slot receiving another portion of the core retention spring therein to secure that portion to the axial end face of the first housing.

The retention assembly of any of the preceding clauses, wherein the plurality of core retention spring features comprises a pair of opposing radially extending spring retention slots and an axially extending lip feature disposed between the slots, wherein each spring retention slot is configured to receive a portion of the core retention spring therein inhibiting axial and circumferential movement of the portion of the core retention spring, and the axially extending lip feature is configured to radially capture an additional portion of the core retention spring thereunder inhibiting radial movement of the core retention spring.

The retention assembly of any of the preceding clauses, wherein the plurality of core retention spring features comprises a first axially extending thru-hole and a second axially extending thru-hole opposing the first thru-hole, both the first and the second thru-holes each complementary to receive spring retention hardware therein, the first and the second thru-holes and the corresponding spring retention hardware configured to secure a portion of the core retention spring to the axial end face of the first housing inhibiting axial and circumferential movement of the portion of the core retention spring.

The retention assembly of any of the preceding clauses, wherein the core retention spring is a segmented core retention spring comprising a plurality of segmented core retention springs, each segmented core retention spring having a first tab leg, a second tab leg, and an active part between the first tab leg and the second tab leg, wherein the first tab leg and the second tab leg of each segmented core retention spring is affixed to the shaped profile at the axial end face of the first housing, and the active part of the segmented core retention spring is in direct contact with the portion of the stator core that extends axially outward from the shaped profile of the first housing, wherein each segmented core retention spring is spaced apart on the shaped profile at the axial end face of the first housing from an adjacent segmented core retention spring.

The retention assembly of any of the preceding clauses, wherein each segmented core retention spring comprises a thru-hole in one or more of the first tab leg and the second tab leg, the thru-hole complementary to receive spring retention hardware therein to secure one of the first tab leg and the second tab leg to the axial end face of the first housing.

The retention assembly of any of the preceding clauses, further comprising a second housing to house the first housing, the second housing extending over the first housing and the core retention spring, wherein the second housing traps the core retention spring thereunder, inhibiting outboard radial movement of the core retention spring.

A retention assembly for retention of a stator core in a stator of an electric machine, comprising: a core end ring circumferentially disposed at an axial end of the stator core; an inner housing to house the stator core and the core end ring, the inner housing having an axial end face with a circumferentially extending scallop-shaped profile, wherein a portion of the core end ring extends axially out from the scallop-shaped profile at the axial end face of the inner housing; and a core retention spring including a plurality of segmented core retention springs disposed circumferentially at the axial end face of the inner housing, each segmented core retention spring contained by the axial end face of the inner housing to inhibit circumferential and radial movement of the core retention spring, wherein each segmented core retention spring has direct contact with the portion of the core end ring that extends axially out from the scallop-shaped profile of the inner housing, each segmented core retention spring pushing against the core end ring, imparting one or more of an axial load and a radial load into the stator core, wherein the axial load and/or the radial load imparted into the stator core by all of the plurality of segmented core retention springs via the core end ring maintains the stator core in axial compression and/or radial compression.

The retention assembly of the preceding clause, wherein the circumferentially extending scallop-shaped profile comprises a plurality of spaced scallop-shaped surfaces formed on the axial end face of the inner housing and a plurality of axially and radially extending core retention spring features, the plurality of core retention spring features arranged at selected scallop-shaped surfaces, wherein the-scallop-shaped profile-forms an alternating pattern of scallop-shaped surfaces with core retention spring features and scallop-shaped surfaces without core retention spring features.

The retention assembly of any of the preceding clauses, wherein the plurality of core retention spring features comprises an axially extending thru-hole complementary to receive spring retention hardware therein and a radially extending spring retention slot opposing the thru-hole, the thru-hole and the spring retention hardware securing a portion of one of the segmented core retention springs to the axial end face of the inner housing and the radially extending spring retention slot receiving another portion of the segmented core retention spring therein to secure that portion of the segmented core retention spring to the axial end face of the inner housing.

The retention assembly of any of the preceding clauses, wherein the plurality of core retention spring features comprises a pair of opposing radially extending spring retention slots and an axially extending lip feature disposed between the spring retention slots, wherein each spring retention slot is configured to receive a portion of one of the segmented core retention springs therein inhibiting axial and circumferential movement of the segmented core retention spring, and the axially extending lip feature is configured to radially capture the segmented core retention spring thereunder inhibiting radial movement of the segmented core retention spring.

The retention assembly of any of the preceding clauses, wherein the plurality of core retention spring features comprises a first axially extending thru-hole and a second axially extending thru-hole opposing the first thru-hole, both the first and the second thru-holes each complementary to receive spring retention hardware therein, the first and the second thru-holes and the corresponding spring retention hardware configured to secure a portion of one of the segmented core retention springs to the axial end face of the inner housing inhibiting axial and circumferential movement of the portion of the core retention spring.

The retention assembly of any of the preceding clauses, wherein the plurality of segmented core retention springs comprise segmented wave springs, each wave spring having a first tab leg, a second tab leg, and an active part between the first tab leg and the second tab leg, wherein the first tab leg and the second tab leg of each wave spring is affixed to the scallop-shaped profile at the axial end face of the inner housing, and the active part of the wave spring is in direct contact with the portion of the core end ring that extends axially out from the scallop-shaped profile of the inner housing, wherein each wave spring is spaced apart on the scallop-shaped profile at the axial end face of the inner housing from an adjacent wave spring.

The retention assembly of any of the preceding clauses, wherein each wave spring comprises a thru-hole in one or more of the first tab leg and the second tab leg, the thru-hole complementary to receive spring retention hardware therein to secure one of the first tab leg and the second tab leg to the axial end face of the inner housing.

The retention assembly of any of the preceding clauses, further comprising an outer housing to house the inner housing, the outer housing extending over the inner housing and the plurality of segmented core retention springs, wherein the outer housing traps the plurality of segmented core retention springs thereunder, inhibiting outboard radial movement of the segmented core retention springs.

An electric machine, comprising: a stator core having a plurality of axially oriented slots extending radially from a central axis of the stator core with a plurality of stator winding coils disposed in the slots; an inner housing to house the stator core, the inner housing having an axial end face with a circumferentially extending scallop-shaped profile, wherein a portion of the stator core extends axially out from the scallop-shaped profile at the axial end face of the inner housing; a core retention spring disposed circumferentially at the axial end face of the inner housing, the core retention spring having direct contact with the portion of the stator core that extends axially outward from the scallop-shaped profile of the inner housing and the scallop-shaped profile of the inner housing, wherein the core retention spring pushes against the portion of the stator core that extends axially out from the scallop-shaped profile of the inner housing, the core retention spring imparting one or more of an axial load and a radial load into the stator core that maintains the stator core in axial and/or radial compression; and an outer housing to house the inner housing, the outer housing extending over the inner housing and the core retention spring, wherein the outer housing traps the core retention spring thereunder, inhibiting outboard radial movement of the core retention spring.

The electric machine of the preceding clause, wherein the circumferentially extending scallop-shaped profile comprises a plurality of spaced scallop-shaped surfaces formed on the axial end face of the inner housing and a plurality of axially and radially extending core retention spring features, wherein the scallop-shaped profile-forms an alternating pattern of scallop-shaped surfaces with core retention spring features and scallop-shaped surfaces without core retention spring features.

The electric machine of any of the preceding clauses, wherein the core retention spring features comprise one or more of at least one radially extending spring retention slot, and at least one axially extending thru-hole.

The electric machine of any of the preceding clauses, wherein the core retention spring is a segmented core retention spring comprising a plurality of segmented core retention springs, each segmented core retention spring having a first tab leg, a second tab leg, and an active part between the first tab leg and the second tab leg, wherein the first tab leg and the second tab leg of each segmented core retention spring is affixed to the scallop-shaped profile at the axial end face of the inner housing, and the active part of the segmented core retention spring is in direct contact with the portion of the stator core that extends axially out from the scallop-shaped profile of the inner housing, wherein each segmented core retention spring is spaced apart on the scallop-shaped profile at the axial end face of the inner housing from an adjacent segmented core retention spring.

What is claimed is:

1. A retention assembly for retention of a stator core in a stator of an electric machine, comprising:
   a first housing to house the stator core, the first housing having an axial end face with a circumferentially extending, shaped profile having recessed portions that project axially inward from the axial end face of the housing alternating with non-recessed portions, wherein a portion of the stator core extends axially outward from the shaped profile at the axial end face of the first housing beyond the recessed portions; and
   a core retention spring disposed circumferentially at the axial end face of the first housing, the core retention spring having direct contact with the portion of the stator core that extends axially outward from the shaped profile of the first housing and the shaped profile of the first housing, wherein the core retention spring pushes against the portion of the stator core that extends axially outward from the shaped profile of the first housing, imparting one or more of an axial load and a radial load into the stator core that maintains the stator core in axial and/or radial compression.

2. The retention assembly of claim 1, wherein the shaped profile of the first housing comprises a scallop-shaped profile having a plurality of spaced scallop-shaped surfaces formed on the axial end face of the first housing and a plurality of axially and radially extending core retention spring features, the plurality of core retention spring features arranged at selected scallop-shaped surfaces, wherein the scallop-shaped profile forms an alternating pattern of scallop-shaped surfaces with core retention spring features and scallop-shaped surfaces without core retention spring features.

3. The retention assembly of claim 2, wherein the plurality of core retention spring features comprises an axially extending thru-hole complementary to receive spring retention hardware therein and a radially extending spring retention slot opposing the thru-hole, the thru-hole and the spring retention hardware securing a portion of the core retention spring to the axial end face of the first housing and the radially extending spring retention slot receiving another portion of the core retention spring therein to secure that portion to the axial end face of the first housing.

4. The retention assembly of claim 2, wherein the plurality of core retention spring features comprises a pair of opposing radially extending spring retention slots and an axially extending lip feature disposed between the slots, wherein each spring retention slot is configured to receive a portion of the core retention spring therein inhibiting axial and circumferential movement of the portion of the core retention spring, and the axially extending lip feature is configured to radially capture an additional portion of the core retention spring thereunder inhibiting radial movement of the core retention spring.

5. The retention assembly of claim 2, wherein the plurality of core retention spring features comprises a first axially extending thru-hole and a second axially extending thru-hole opposing the first thru-hole, both the first and the second thru-holes each complementary to receive spring retention hardware therein, the first and the second thru-holes and the corresponding spring retention hardware configured to secure a portion of the core retention spring to the axial end face of the first housing inhibiting axial and circumferential movement of the portion of the core retention spring.

6. The retention assembly of claim 1, wherein the core retention spring is a segmented core retention spring comprising a plurality of segmented core retention springs, each segmented core retention spring having a first tab leg, a second tab leg, and an active part between the first tab leg and the second tab leg, wherein the first tab leg and the second tab leg of each segmented core retention spring is affixed to the shaped profile at the axial end face of the first housing, and the active part of the segmented core retention spring is in direct contact with the portion of the stator core that extends axially outward from the shaped profile of the first housing, wherein each segmented core retention spring is spaced apart on the shaped profile at the axial end face of the first housing from an adjacent segmented core retention spring.

7. The retention assembly of claim 6, wherein each segmented core retention spring comprises a thru-hole in one or more of the first tab leg and the second tab leg, the thru-hole complementary to receive spring retention hardware therein to secure one of the first tab leg and the second tab leg to the axial end face of the first housing.

8. The retention assembly of claim 1, further comprising a second housing to house the first housing, the second housing extending over the first housing and the core retention spring, wherein the second housing traps the core retention spring thereunder, inhibiting outboard radial movement of the core retention spring.

9. A retention assembly for retention of a stator core in a stator of an electric machine, comprising:
   a core end ring circumferentially disposed at an axial end of the stator core;
   an inner housing to house the stator core and the core end ring, the inner housing having an axial end face with a circumferentially extending scallop-shaped profile, wherein a portion of the core end ring extends axially out from the scallop-shaped profile at the axial end face of the inner housing; and
   a core retention spring including a plurality of segmented core retention springs disposed circumferentially at the axial end face of the inner housing, each segmented core retention spring contained by the axial end face of the inner housing to inhibit circumferential and radial movement of the core retention spring, wherein each segmented core retention spring has direct contact with the portion of the core end ring that extends axially out from the scallop-shaped profile of the inner housing, each segmented core retention spring pushing against the core end ring, imparting one or more of an axial load and a radial load into the stator core, wherein the axial load and/or the radial load imparted into the stator core by all of the plurality of segmented core retention springs via the core end ring maintains the stator core in axial compression and/or radial compression.

10. The retention assembly of claim 9, wherein the circumferentially extending scallop-shaped profile comprises a plurality of spaced scallop-shaped surfaces formed on the axial end face of the inner housing and a plurality of axially and radially extending core retention spring features, the plurality of core retention spring features arranged at selected scallop-shaped surfaces, wherein the-scallop-shaped profile-forms an alternating pattern of scallop-shaped surfaces with core retention spring features and scallop-shaped surfaces without core retention spring features.

11. The retention assembly of claim 10, wherein the plurality of core retention spring features comprises an axially extending thru-hole complementary to receive spring retention hardware therein and a radially extending spring retention slot opposing the thru-hole, the thru-hole and the spring retention hardware securing a portion of one of the segmented core retention springs to the axial end face of the inner housing and the radially extending spring retention slot receiving another portion of the segmented core retention spring therein to secure that portion of the segmented core retention spring to the axial end face of the inner housing.

12. The retention assembly of claim 10, wherein the plurality of core retention spring features comprises a pair of opposing radially extending spring retention slots and an axially extending lip feature disposed between the spring retention slots, wherein each spring retention slot is configured to receive a portion of one of the segmented core retention springs therein inhibiting axial and circumferential movement of the segmented core retention spring, and the axially extending lip feature is configured to radially capture the segmented core retention spring thereunder inhibiting radial movement of the segmented core retention spring.

13. The retention assembly of claim 10, wherein the plurality of core retention spring features comprises a first axially extending thru-hole and a second axially extending thru-hole opposing the first thru-hole, both the first and the second thru-holes each complementary to receive spring retention hardware therein, the first and the second thru-holes and the corresponding spring retention hardware configured to secure a portion of one of the segmented core retention springs to the axial end face of the inner housing inhibiting axial and circumferential movement of the portion of the core retention spring.

14. The retention assembly of claim 9, wherein the plurality of segmented core retention springs comprise segmented wave springs, each wave spring having a first tab leg, a second tab leg, and an active part between the first tab leg and the second tab leg, wherein the first tab leg and the second tab leg of each wave spring is affixed to the scallop-shaped profile at the axial end face of the inner housing, and the active part of the wave spring is in direct contact with the portion of the core end ring that extends axially out from the scallop-shaped profile of the inner housing, wherein each wave spring is spaced apart on the scallop-shaped profile at the axial end face of the inner housing from an adjacent wave spring.

15. The retention assembly of claim 14, wherein each wave spring comprises a thru-hole in one or more of the first tab leg and the second tab leg, the thru-hole complementary to receive spring retention hardware therein to secure one of the first tab leg and the second tab leg to the axial end face of the inner housing.

16. The retention assembly of claim 9, further comprising an outer housing to house the inner housing, the outer housing extending over the inner housing and the plurality of segmented core retention springs, wherein the outer housing traps the plurality of segmented core retention springs thereunder, inhibiting outboard radial movement of the segmented core retention springs.

17. An electric machine, comprising:
a stator core having a plurality of axially oriented slots extending radially from a central axis of the stator core with a plurality of stator winding coils disposed in the slots;
an inner housing to house the stator core, the inner housing having an axial end face with a circumferentially extending scallop-shaped profile, wherein a portion of the stator core extends axially out from the scallop-shaped profile at the axial end face of the inner housing;
a core retention spring disposed circumferentially at the axial end face of the inner housing, the core retention spring having direct contact with the portion of the stator core that extends axially outward from the scallop-shaped profile of the inner housing and the scallop-shaped profile of the inner housing, wherein the core retention spring pushes against the portion of the stator core that extends axially out from the scallop-shaped profile of the inner housing, the core retention spring imparting one or more of an axial load and a radial load into the stator core that maintains the stator core in axial and/or radial compression; and
an outer housing to house the inner housing, the outer housing extending over the inner housing and the core retention spring, wherein the outer housing traps the core retention spring thereunder, inhibiting outboard radial movement of the core retention spring.

18. The electric machine of claim 17, wherein the circumferentially extending scallop-shaped profile comprises a plurality of spaced scallop-shaped surfaces formed on the axial end face of the inner housing and a plurality of axially and radially extending core retention spring features, wherein the-scallop-shaped profile forms an alternating pattern of scallop-shaped surfaces with core retention spring features and scallop-shaped surfaces without core retention spring features.

19. The electric machine of claim 17, wherein the core retention spring features comprise one or more of at least one radially extending spring retention slot, and at least one axially extending thru-hole.

20. The electric machine of claim 17, wherein the core retention spring is a segmented core retention spring comprising a plurality of segmented core retention springs, each segmented core retention spring having a first tab leg, a second tab leg, and an active part between the first tab leg and the second tab leg, wherein the first tab leg and the second tab leg of each segmented core retention spring is affixed to the scallop-shaped profile at the axial end face of the inner housing, and the active part of the segmented core retention spring is in direct contact with the portion of the stator core that extends axially out from the scallop-shaped profile of the inner housing, wherein each segmented core retention spring is spaced apart on the scallop-shaped profile at the axial end face of the inner housing from an adjacent segmented core retention spring.

* * * * *